United States Patent

[11] 3,556,426

[72] Inventors Lennart Olander
Jonkoping;
Gunnar Kallman, Boras, Sweden

[21] Appl. No. 779,343
[22] Filed Nov. 27, 1968
[45] Patented Jan. 19, 1971

[73] Assignee Aktiebolaget Fannyudde
Stockholm, Sweden
a Swedish Company

[54] REEL FOR RECORDING TAPE
3 Claims, 4 Drawing Figs.

[52] U.S. Cl. ........................................ 242/74, 242/71.8
[51] Int. Cl. ........................................ B65h 75/28
[50] Field of Search ........................................ 242/74, 74.1, 74.2, 71.8A

[56] References Cited
UNITED STATES PATENTS
2,863,614 12/1958 .................................... 242/74

*Primary Examiner*—Nathan L. Mintz
*Attorney*—Holman & Stern

ABSTRACT: A reel for recording tape or film is comprised of two separable parts having mating faces generated by lines parallel to the axis of the reel, the said mating faces being adapted to receive and clamp one end of the tape or film. One of the parts has a horseshoe-shaped recess forming part of this mating face. The other of the parts has a projection cooperating with the horseshoe-shaped recess to hold the parts together.

INVENTOR
LENNART OLANDER ET AL
BY Holman, Glascock
Downing & Seebold
ATTORNEYS

REEL FOR RECORDING TAPE

The present invention concerns a reel for recording tape, film and so on.

An object of the invention is to produce a reel which greatly facilitates the fastening of the end of the tape.

The invention, the characteristics of which can be seen from the claims, is described in detail below with reference to the drawing, in which:

Figures 3, 4:
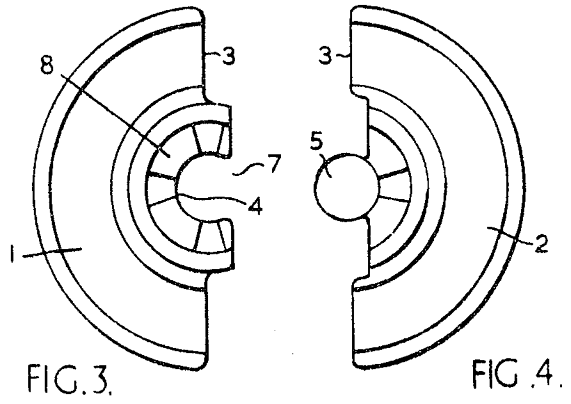
FIGS. 3 and 4 are plan views of the two parts of the same reel, in unassembled state.

The reel shown is divided into two parts 1 and 2 along surfaces 3 with generatrices parallel to the axis of the reel, the two parts being shown in unassembled state in FIGS. 3 and 4. Part 1 has a central, horseshoe-shaped recess 4 and part 2 has a corresponding projection 5, which when the two parts are assembled engages in the recess 4, so that the end 6 of a tape or film inserted between the two parts is clamped there.

The recess 4 has preferably a radial opening 7, which is so narrow that the projection 5 has to be pressed in with comparatively great pressure, and snaps into the recess 4, so that the parts 1 and 2 hold each other firmly.

The surfaces 3, directed in the drawing substantially in accordance with a diametral plane, can also run in some other way, for instance along two radial planes forming together an angle other than 180°, or along curved surfaces.

Figure 1:
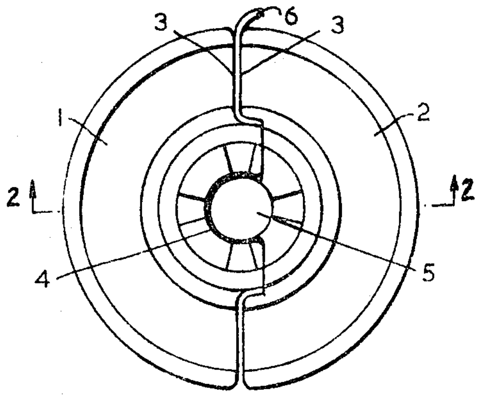
FIG. 1 is a plan view of the reel of the invention, when assembled.
Figure 2:
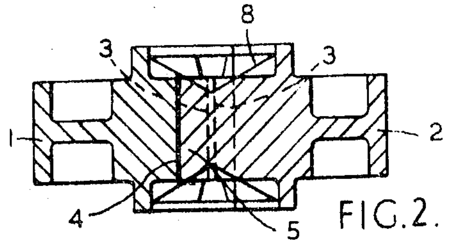
FIG. 2 is a section along the line 2–2 in FIG. 1.

As can be seen in detail in FIG. 2, one axial end surface, or preferably both axial end surfaces, of the projection 5 can be formed together with adjacent portions of the surrounding reel area, as a conical depression 8 for the insertion of a center shaft, not shown, for holding the reel firmly. The center shaft may be driven.

We claim:

1. In a reel for recoding tape or film the improvement that the reel is comprised of two separable parts having mating faces generated by lines parallel to the axis of the reel, the said mating faces being adapted to receive and clamp one end of the tape or film, and one of the said parts having a horseshoe-shaped recess forming part of this mating face, the other of said parts having a projection cooperating with the horseshoe-shaped recess to hold the parts together.

2. A reel as claimed in claim 1, in which the horseshoe-shaped recess has a narrow opening directed towards the other part and cooperating with the projection to cause the parts to be snap fitted together.

3. A reel as claimed in claim 1, in which the projection has an axially directed face forming part of a conical depression for cooperating with a center shaft.